Figure 1:
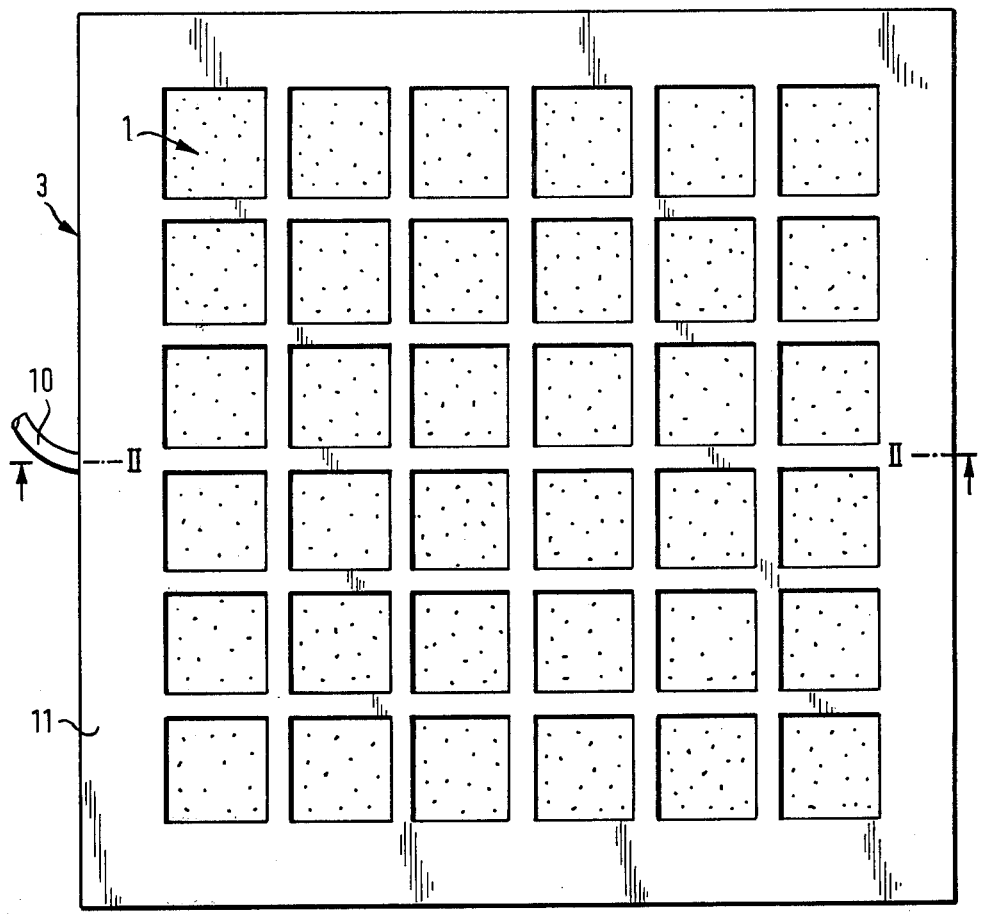

United States Patent [19]

Hennart et al.

[11] 4,037,352

[45] July 26, 1977

[54] ELECTRICAL DEVICE WHICH EMITS INSECTICIDAL VAPORS

[75] Inventors: Claude Hennart, Le Clos Baron a Seraincourt; René Blanc, Poitiers, both of France

[73] Assignee: Airwick Industries, Inc., Carlstadt, N.J.

[21] Appl. No.: 726,027

[22] Filed: Sept. 23, 1976

Related U.S. Application Data

[63] Continuation of Ser. No. 634,580, Nov. 24, 1975, abandoned.

[30] Foreign Application Priority Data

Sept. 5, 1975 Luxembourg .......................... 73337

[51] Int. Cl.$^2$ ............................................. A01M 19/00
[52] U.S. Cl. ..................................... 43/129; 239/136; 424/219
[58] Field of Search ....................... 43/129, 131; 239/6, 239/56, 60, 136; 424/40, 186, 219

[56] References Cited

U.S. PATENT DOCUMENTS

| | | | |
|---|---|---|---|
| 2,808,679 | 10/1957 | Collins | 43/131 |
| 2,882,640 | 4/1959 | Kopecky | 43/129 |
| 3,279,118 | 10/1966 | Allen | 43/129 |
| 3,605,321 | 9/1971 | Lazarus | 43/131 |
| 3,754,861 | 8/1973 | Sadahiro | 424/40 X |
| 3,826,036 | 7/1974 | Neugebauer | 43/131 |

FOREIGN PATENT DOCUMENTS 556,003   4/1957   Belgium .................. 43/129

Primary Examiner—Louis G. Mancene
Assistant Examiner—Daniel J. Leach
Attorney, Agent, or Firm—Karl F. Jorda

[57] ABSTRACT

A device intended to emit vapors emitted by an active substance, in particular an insecticidal substance, which comprises, in a rigid assembly a. a reservoir intended to contain the active substance and having an evaporation surface for the emission of the active vapors, b. an electrical resistance associated with the said reservoir in such a way as to heat at least the part of the said reservoir which comprises, or is close to, the said evaporation surface, and c. a system for connecting the resistance to a source of electric current: the said reservoir comprises i. a system of two plates of a porous or fibrous material, one of the large faces of one of the plates facing one of the large faces of the other, and a frame for the plates, which separates the space between the two plates from the exterior while leaving entirely or partially free at least one of the two large external faces of the two plates, which can thus serve as an evaporation surface, and ii. a pyrethrinoid insecticidal substance having a vapor pressure, at 25° C, of between $1 \times 10^{-6}$ and $1.5 \times 10^{-4}$ mbar, with which the two plates are impregnated, the total evaporation surface of the two plates being at least 20 cm$^2$, the amount of active substance being sufficient to give efficient evaporation, at 90° C for a period of at least 10 hours, and the thickness of the plates being sufficient to absorb the said amount of active substance:

the said resistance is enclosed within the said system and is so constructed as to heat the large internal faces of the two plates to a temperature not exceeding 90° C.

17 Claims, 2 Drawing Figures

U.S. Patent

July 26, 1977

4,037,352

ELECTRICAL DEVICE WHICH EMITS INSECTICIDAL VAPORS

This is a continuation of application Ser. No. 634,580 filed on Nov. 24, 1975, now abandoned.

The present invention relates to a device intended to emit vapours from an active substance, in particular an insecticidal substance, which device comprises, in a rigid assembly a. a reservoir intended to contain the active substance and having an evaporation surface for the emission of the active vapours, b. an electrical resistance associated with the said reservoir in such a way as to heat at least the part of the said reservoir which comprises, or is close to, the said evaporation surface, and c. a system for connecting the resistance to a source of electric current.

Such a device has already been described in French Pat. Nos. 981,852, 986,269, 1,092,141, 1,165,348, 1,178,391, 1,384,062, 2,054,435 and 2,175,596 and in Italian Pat. No. 713,459, and comprises the electric heating of a very small heating surface, so that it is only possible to employ small amounts of active substance which it is necessary to renew frequently and, because of the smallness of the evaporation surface, it is not possible to achieve sufficient evaporation except by increasing the temperature, which causes decomposition of the active substance.

In French Pat. No. 1,384,062 and Italian Pat. No. 713,459, which have already been cited, attempts have been made to avoid the disadvantages presented by the need frequently to renew the amounts of active substance, by equipping the device with a reservoir which contains the active composition and regularly feeding the heating surface with the active composition. However, this enormously complicates the device, which becomes bulky, expensive and of doubtful reliability.

It is a main object of the present invention to provide a device which does not suffer from any of the abovementioned disadvantages. The device must be light, coherent, of little bulk, simple and of low cost; it must contain a plentiful reserve of insecticidal substance, which allows it to function for a long period without requiring recharging; its evaporation surface must be sufficiently large to give good emission of vapours without requiring an excessively high temperature.

More especially, this device must be able to use an insecticidal substance selected from amongst the pyrethrinoid (Kirk-Othmer, 11, p. 684) compounds, which belong to the most effective materials currently known.

Now it is known that the pyrethrinoid compounds are particularly sensitive to heat, to light and to oxygen and atmospheric moisture, and a fortiori to the combined action of these elements, as is witnessed by numerous attempts to stabilise these insecticidal agents (French Pat. Nos. 2,067,303, 2,072,055, 2,218,051, 2,226,112 and 2,230,292 and Japanese Pat. nos. 7,242,831, 7,305,582, 7,398,023, 7,398,024, 7,399,326, 7,399,327, 7,399,328, 7,426,420 and 7,493,529 of SUMITOMO CHEM. Co.; U.S. Pat. No. 2,421,223 of Gulf Oil Co.; U.S. Pat. No. 2,772,198 of Standard Oil Co.; Japanese Pat. No. 7,310,205 of Toyo Aerosol Industry; French Pat. No. 2,009,758 of S.C. Johnson and Son; U.S. Pat. No. 3,839,561 of SCM Corporation; French Pat. No. 2,201,832 of ROUSSEL-UCLAF; U.S. Pat. No. 3,560,613 of the U.S. Secretary of Agriculture; Japanese Pat. Nos. 7,218,667, 7,243,226 and 7,358,128 of Yoshitomi Pharmaceutical Industries; and also Pyrethrum Post, 1963, Nos. 1, 34; J. Econ. Entomol. 1961, 54, 731; and J. Agr. Food Chem. 1972, 20, 313; Ann. Appl. Biol, 1960, 48, 352).

The current state of the art thus seems to stand in the way of the design of a device in which a pyrethrinoid insecticidal substance is exposed simultaneously, and for a prolonged period which may amount to several weeks or several months, to a high temperature, to light and to atmospheric agents.

This is undoubtedly the reason why no attempt has ever been made to produce such a device and why the attempts have been restricted to devices which expose the insecticidal material at most for only a few hours to heat at the same time as to other harmful factors.

The Applicant Company has now found that, surprisingly, it was possible to achieve a permanent and prolonged insecticidal effectiveness by vapourising such pyrethrin-type insecticidal substances into the atmosphere by means of the device which forms the subject of the invention.

Contrary to the known devices, such as, for example, that described in Italian Pat. No. 713,459 of Fumakiller Ltd., wherein the heating surface is reduced to a few square centimeters and wherein the operating temperature, in the case of pyrethrinoid compounds, is greater than 120° C, the device according to the present invention has a heating surface which can be as much as several square decimeters, whilst its operating temperature does not exceed 90° C. For example, in the present invention, the chrysanthemic acid esters of the allethrin family are effectively vapourised at a temperature of between 80° and 85° C, whilst in the abovementioned patent (page 5) a temperature below 130° is stated to be inadequate (French Pat. No. 2,054,435, of the same inventor and later than the said Italian patent, even demands a temperature of at least 140° C).

The objects of the invention are thus achieved by a device of the type described initially, which is characterised in that the said reservoir comprises i. a system of two plates of a porous or fibrous material, one of the large faces of one of the plates facing one of the large faces of the other, and a frame for the plates, which separates the space between the two plates from the exterior whilst leaving entirely or partially free at least one of the two large external faces of the two plates, which can thus serve as an evaporation surface, and ii. a pyrethrinoid insecticidal substance having a vapour pressure, at 25° C, of between $1 \times 10^{-6}$ and $1.5 \times 10^{-4}$ millibars, with which the two plates are impregnated, the total evaporation surface of the two plates being at least 20 cm², the amount of active substance being sufficient to give efficient evaporation, at 90° C for a period of at least 10 hours, and the thickness of the plates being sufficient to absorb the said amount of active substance, and in that the said resistance is enclosed within the said system and is so constructed as to heat the large internal faces of the two plates to a temperature not exceeding 90° C.

The plates are made of a material capable of absorbing and retaining the selected amount of active substance and must be inert towards the latter. Such a material is, for example, a non-sized cellulose board such as a board made of wood fibre, cereal fibre, esparto fibre, cotton fibre and waste paper, a board made of asbestos, glass fibres or polymeric fibres, a wool, or wool and cotton, felt, a baked clay tile, sintered alumina or porcelain which has not been subjected to biscuit baking.

The shape of the plates is not critical; it can be round, oval, square, rectangular, triangular or any polygonal shape; the surface area of one of the sides of a plate is preferably between 20 cm², and preferably between 40 cm² and 200 cm²; the thickness of a plate depends on the amount of composition, containing the insecticidal substance, to be absorbed; it is generally between 0.2 and 6 millimeters and preferably between 0.8 and 5 millimeters.

The material of which the plates consist can also contain fillers which are inert towards the active substance, such as, for example, silica, barium sulphate, titanium oxide, kaolin and kieselguhr, as well as pigments or dyestuffs.

The electrical resistance is preferably of a size substantially equal to that of the plates of the reservoir; it is produced, for example, by winding a resistance wire around a plate or a frame of a solid electrical insulating material, or by enclosing the said wire in a flexible woven electrical insulating material. Suitable insulating materials which may be mentioned are mica, asbestos, porcelain, baked clay and macromolecular substances which are flameproof, and inert towards the active substance such as, for example, polytetrafluoroethylene.

The nature, diameter and length of the resistance wire are so chosen as to give the appropriate temperature for the desired level of evaporation of the active substance, taking into account the available voltage. Preferably, this temperature is between 30° and 90° C and, better still, between 50° and 85° C.

Preferably, the electrical power consumed by the resistance is between 0.5 and 10 watts per square decimeter of external surface of the plates of the reservoir. Better still, this power is between 1 and 5 watts.

The electrical resistance can be separated from the plates of the reservoir by an electrical insulation located either side of the said resistance and consisting, for example, of a varnish, a lacquer, a paint or a sheet of a material chosen from amongst those mentioned as suitable for the support of the resistance.

The connecting system consists of a pin-type plug and/or a cable with conducting wires, such as are known to those skilled in matters of electrical connections.

To obtain a rigid assembly, which is preferably inseparable, the device according to the invention preferably comprises a system of joining together, or framing, which consists of any suitable means such as seaming, clamping or glueing. It can thus consist of a frame which matches the periphery of the device or of a case of which the faces are perforated so as to allow the insecticidal vapours to pass; this latter device constitutes an assembly which has the advantage of being rigid, solid and attractive and of avoiding any contact of the hands with the insecticidal substance. The frame or case can be made of metal or preferably of a synthetic plastic which is inert towards the insecticidal substance, such as, for example, polyethylene, polypropylene and the polyamides. The pieces of which the frame or the case is made up can be assembled, for example, by glueing, welding or a snap-fit.

The devices according to the invention can be packaged in any leakproof material which is inert towards the active substance and impermeable to moisture, on the one hand, and to the vapours of the active substance, on the other.

It is possible to use metals such as tinplate or aluminum or thermoplastics such as polyamides and polyethylene. According to a preferred version, the packaging material consists of a laminated multi-layer combination which is heat-sealable on one face, of a type known as a "complex" in the packaging field. Such complexes are described, for example, in French Pat. Nos. 1,568,983 and 1,580,871. Numerous complexes are known; the number and nature of their layers can be varied extensively. They may contain, in different sequences, layers of paper, aluminum, polyethylene, polyamide, polyester, copolymers with a high content of vinylidene chloride, oriented polypropylene, a hot-melt resin or an ionomeric resin.

If the system of holding the assembly together consists of a frame of the said type or a case, a sheet of complex can be glued or welded onto the latter on each side so as thus to ensure that the assembly is leakproof during storage and transport; the device is then put into operation by simply tearing off or detaching the said sheets.

Preferably, the two plates of the system are placed in parallel and flat, on either side of the electrical resistance, which is of flat shape. For use in a room or hall, it is advantageous if the total volume of the reservoir represented by the two plates is between 4 and 400 cm³.

The composition which is used to impregnate the plates of the device according to the invention preferably consists of pyrethrinoid compounds having a vapour pressure of between $1 \times 10^{-6}$ and $1.5 \times ^{-4}$ mbar at 25° C and, optionally, at least one adjuvant which is inert towards the said compound and is chosen from amongst diluents, thickeners, stabilisers, perfumes, synergistic agents and dyestuffs.

The formulation of this composition preferably contains at least 5% by weight of pyrethrinoid compound.

The pyrethrinoid compounds are preferably chosen from amongst the insecticidal esters of chrysanthemic acid, in their racemic forms or resolved into the d- and/or l-, cis- and/or trans-forms.

These esters include, for example, the following:

| | Vapour pressure at 25° C (mm Hg) | Compound |
|---|---|---|
| (1) | $2 \times 10^{-6}$ | 3-Crotyl-2-methyl-4-oxo-cyclopent-2-enyl chrysanthemate (a) |
| (2) | $2 \times 10^{-6}$ | (5-Allyl-furyl-3)-methyl chrysanthemate |
| (3) | $2 \times 10^{-6}$ | 4-Allyl-2,6-dimethyl-benzyl chrysanthemate (b) |
| (4) | $3 \times 10^{-6}$ | (2,4,5-Trimethyl-furyl-3)-methyl chrysanthemate |
| (5) | $3 \times 10^{-6}$ | 5-Allyl-furfuryl chrysanthemate |
| (6) | $3 \times 10^{-6}$ | 5-Propargyl-furfuryl chrysanthemate (c) |
| (7) | $3 \times 10^{-6}$ | 4-Methallyl-benzyl chrysanthemate |
| (8) | $4.5 \times 10^{-6}$ | 4-(But-3-enyl)-benzyl chrysanthemate |
| (9) | $5 \times 10^{-6}$ | 3-Methallyl-2-methyl-4-oxo-cyclopent-2-enyl chrysanthemate |
| (10) | $5 \times 10^{-6}$ | 3-(2-Methyl-prop-2-enyl)-2-methyl-4-oxo-cyclopent-2-enyl chrysanthemate |
| (11) | $6 \times 10^{-6}$ | 3-(Pent-2-enyl)-2-methyl-4-oxo-cyclopent-2-enyl chrysanthemate |
| (12) | $6 \times 10^{-6}$ | 4-Allyl-benzyl chrysanthemate (d) |
| (13) | $6 \times 10^{-6}$ | (2,5-Dimethyl-furyl-3)-methyl chrysanthemate |
| (14) | $7 \times 10^{-6}$ | 4-(2,3-Dichlorophenyl)-but-2-enyl chrysanthemate |
| (15) | $7 \times 10^{-6}$ | 3-(3-Chlorophenyl)-prop-2-ynyl chrysanthemate |
| (16) | $7 \times 10^{-6}$ | 3-Furfuryl-2-methyl-4-oxo-cyclopent-2-enyl chrysanthemate (e) |
| (17) | $9 \times 10^{-6}$ | 4-(2-Methoxyphenyl)-but-2-enyl chrysanthemate |
| (18) | $9 \times 10^{-6}$ | 4-Vinyl-benzyl chrysanthemate |

-continued

| Vapour pressure at 25° C (mm Hg) | | Compound |
|---|---|---|
| (19) | 9 × 10$^{-6}$ | 4,5-Dimethyl-furfuryl chrysanthemate |
| (20) | 1 × 10$^{-5}$ | (2-Methyl-furyl-3)-methyl chrysanthemate |
| (21) | 1 × 10$^{-5}$ | 3,5-Dimethyl-furfuryl chrysanthemate |
| (22) | 1 × 10$^{-5}$ | 2,4,6-Trimethyl-benzyl chrysanthemate |
| (23) | 1.5 × 10$^{-5}$ | 2,3-Dimethyl-benzyl chrysanthemate |
| (24) | 1.5 × 10$^{-5}$ | 4-(3-Bromophenyl)-but-2-enyl chrysanthemate |
| (25) | 1.5 × 10$^{-5}$ | 4-(2,3-Dimethylphenyl)-but-2-enyl chrysanthemate |
| (26) | 1.5 × 10$^{-5}$ | 3-Methyl-furfuryl chrysanthemate |
| (27) | 1.5 × 10$^{-5}$ | 5-Methyl-furfuryl chrysanthemate |
| (28) | 1.7 × 10$^{-5}$ | 3-Allyl-2-methyl-4-oxo-cyclopent-2-enyl chrysanthemate (f) |
| (29) | 2 × 10$^{-5}$ | 2,6-Dimethyl-benzyl chrysanthemate |
| (30) | 2 × 10$^{-5}$ | 3,4-Dimethyl-benzyl chrysanthemate (g) |
| (31) | 2 × 10$^{-5}$ | 3,5-Dimethyl-benzyl chrysanthemate |
| (32) | 2 × 10$^{-5}$ | 4-(3-Chlorophenyl)-but-2-enyl chrysanthemate |
| (33) | 2 × 10$^{-5}$ | 2,4-Dimethyl-benzyl chrysanthemate (h) |
| (34) | 2.5 × 10$^{-5}$ | 1-Phenyl-prop-2-ynyl chrysanthemate |
| (35) | 2.5 × 10$^{-5}$ | 4-(2-Methylphenyl)-but-2-enyl chrysanthemate |
| (36) | 2.5 × 10$^{-5}$ | 4-Methyl-benzyl chrysanthemate |
| (37) | 2.5 × 10$^{-5}$ | 2,5-Dimethyl-benzyl chrysanthemate |
| (38) | 2.5 × 10$^{-5}$ | 4-Phenyl-but-2-ynyl chrysanthemate |
| (39) | 3 × 10$^{-5}$ | 3-Methyl-benzyl chrysanthemate |
| (40) | 4 × 10$^{-5}$ | 4-(Thienyl-2)-but-2-ynyl chrysanthemate |
| (41) | 4 × 10$^{-5}$ | 4-(2-Chlorophenyl)-but-2-enyl chrysanthemate |
| (42) | 4 × 10$^{-5}$ | 3-(Cyclopent-2-enyl)-2-methyl-4-oxo-cyclopent-2-enyl chrysanthemate (i) |
| (43) | 5 × 10$^{-5}$ | 3-Ethyl-2-methyl-4-oxo-cyclopent-2-enyl chrysanthemate |
| (44) | 5 × 10$^{-5}$ | 1-(3-Fluorophenyl)-prop-2-ynyl chrysanthemate |
| (45) | 5 × 10$^{-5}$ | 1-(Thienyl-2)-prop-2-ynyl chrysanthemate |
| (46) | 5 × 10$^{-5}$ | 4-(3-Methylphenyl)-but-2-enyl chrysanthemate |
| (47) | 6 × 10$^{-5}$ | 4-Phenyl-but-2-enyl chrysanthemate |
| (48) | 6 × 10$^{-5}$ | 2-Methyl-benzyl chrysanthemate (j) |
| (49) | 7 × 10$^{-5}$ | 4-(Furyl-2)-but-2-ynyl chrysanthemate |
| (50) | 7 × 10$^{-5}$ | 5-Methyl-hex-5-en-2-ynyl chrysanthemate |
| (51) | 9 × 10$^{-5}$ | 1-(3-Trifluoromethyl-phenyl)-prop-2-ynyl chrysanthemate |
| (52) | 1 × 10$^{-4}$ | 5-Methyl-hexa-2,5-dienyl chrysanthemate |
| (53) | 1 × 10$^{-4}$ | 5,6-Dimethyl-hept-5-en-2-ynyl chrysanthemate |

(a) Compound known by the name of cinerin
(b) Compound known by the name of DMABC
(c) Compound known by the name of prothrin or furamethrin
(d) Compound known by the name of benathrin or ABC
(e) Compound known by the name of furethrin
(f) Compound known by the name of allethrin if the ester is formed from a dl/cis-trans acid and a dl alcohol, by the name of bioallethrin if the ester is formed from a d/trans acid and a dl alcohol and by the name of S-bioallethrin if the ester is formed from a d/trans acid and a d alcohol.
(g) Compound known by the name of ENT 21,825
(h) Compound known by the name of dimethrin if the ester is formed from a dl/cis-trans acid and biodimethrin if the ester is formed from a d/trans acid.
(i) Compound known by the name of cyclethrin
(j) Compound known by the name of ENT 21,559.

The inert diluents which can be present in the above-mentioned composition are organic compounds which are inert towards the other constituents of the device and which preferably have a vapour pressure not exceeding that of the pyrethrinoid compound present. Preferably, the inert diluents used act as solvents for the insecticidal compound.

The suitable diluents include, for example, the following compounds:

1. The diesters formed from alkanols and dicarboxylic hydrocarbons such as, for example, dialkyl adipates such as dioctyl adipate and dinonyl adipate, dialkyl sebacates such as dibutyl sebacate, dipentyl sebacate and dioctyl sebacate, dialkyl azelates such as dioctyl azelate, and dialkyl phthalates such as dibutyl phthalate, dioctyl phthalate and didecyl phthalate, di-undecyl phthalate, di-dodecyl phthalate, di-tridecyl phthalate, di-tetradecyl phthalate and dicetyl phthalate.

2. The diesters formed from alkyl-substituted or unsubstituted phenols and dicarboxylic hydrocarbons, such as, for example, diaryl phthalates, such as diphenyl phthalate and dicresyl phthalates.

3. The diesters formed from alkyl-substituted or unsubstituted cycloalkanols and dicarboxylic hydrocarbons such as, for example, dicyclohexyl phthalate and the bis-methylcyclohexyl phthalates.

4. The diesters formed from phenylalkanols and dicarboxylic hydrocarbons such as, for example, dibenzyl sebacate.

5. The diesters formed from alkanediols and monocarboxylic hydrocarbons such as, for example, 2,2,4-trimethylpentane-1,3-diol diisobutyrate.

6. The triesters formed from alkyl-substituted or unsubstituted phenols and phosphoric acid, such as, for example, triphenyl phosphate, tris-(4-tertiary butyl-phenyl) phosphate and the tricresyl phosphates.

7. The triesters formed from alkanols and phosphoric acid such as, for example, trioctyl phosphate.

8. The polyalkylene glycols such as, for example, the polyethylene glycols and the polypropylene glycols.

9. The fatty alcohols such as, for example, hexadecanol, octadecanol and octadec-9-enol.

10. The fatty acids such as, for example, lauric, myristic, palmitic, stearic and oleic acid.

11. The alkanes containing at least 18 carbon atoms such as, for example, octadecane, eicosane, docosane and tetracosane, and their mixtures known by the names of vaseline oil, paraffin oil, heavy oil, gas oil, fuel oil, road oil, valve oil, mazout, vaseline, petrolatum, gatsch, paraffin, microwax, ozokerite and ceresin.

12. The alkanones containing at least eighteen carbon atoms such as, for example, caprinone, laurone, myristone, palmitone and stearone.

13. The alkenones containing at least eighteen carbon atoms such as, for example, heneicosa-1,20-dien-11-one and oleone.

14. The chlorinated biphenyls and terphenyls such as, for example, the monochlorobiphenyls, the tetrachlorobiphenyls, the hexachlorobiphenyls, perchlorobiphenyl, the pentachloroterphenyls, the nonachloroterphenyls and perchloroterphenyl.

15. The non-volatile halogenoalkanes such as, for example, chlorooctadecane, bromohexadecane, bromooctadecane and chlorinated paraffin waxes.

The composition containing the active substance is liquid or solid at ambient temperature; if it is solid, its liquefaction point preferably does not exceed a temperature of 120° C and, better still, 90° C.

The thickeners are, for example, metal salts of a fatty acid, such as aluminum or magnesium monostearates, distearates and tristearates, or the salts of a fatty acid and an amine, such as hexadecylaminopropylene-amine dioleate, octadecylaminopropylene-amine dioleate and octadecenylaminopropylene-amine dioleate, or the modified montmorillonites, such as the ammonium salts of dimethyl-di-(higher alkyl)-bentonite.

The stabilisers used to stabilise a pyrethrin-type insecticidal compound are preferably chosen from amongst epoxidised compounds, azo compounds and their metallised derivatives, benzodioxoles, phenolic compounds, carboxylic acid anhydrides, sulphur, compounds containing at least one divalent sulphur atom and aromatic amines.

The epoxidised compounds are preferably used in an amount of between 1 and 40% of the weight of the insecticidal substance and are preferably chosen from amongst epoxidised triglycerides such as epoxidised linseed oil, epoxidised poppyseed oil, epoxidised soya oil, epoxidised cottonseed oil, epoxidised groundnut oil, epoxidised wheat oil, epoxidised safflower oil and epoxidised sunflower oil, alkyl epoxystearates, diepoxy-stearates and triepoxy-stearates, such as the butyl, methylbutyl, ethylbutyl, hexyl, heptyl, octyol, isooctyl and ethylhexyl epoxidised oleates, diepoxidised linoleates and triepoxidised linolenates, and epoxycyclohexyl carboxylate esters, such as bis-(methylepoxycyclohexyl) adipate and epoxycyclohexyl epoxycyclohexane-carboxylate.

Suitable azo compounds are, for example, those quoted in British Pat. No. 1,308,951 filed by the Applicant Company on Mar. 11, 1970 * (especially on page 3, line 47 to page 8, line 47 thereof).

Suitable benzodioxoles are, for example, those quoted in French Pat. No. 2,112,069 filed by the Applicant Company on Sept. 11, 1970 * (especially on page 3, line 9 to page 11, line 22 thereof).

\* (These compounds are used in this patent to stabilise volatile phosphoric acid esters but also serve to stabilise pyrethrinoid esters).

Suitable phenolic compounds possess one or more phenolic groups and are, for example, 4-tertiary butylphenol, the tertiary butyl-cresols, 4-amyl-phenol, 4-octylphenol, 4-nonyl-phenol, the phenylphenols, the phenoxyphenols, alphanaphthol, beta-naphthol, hydroquinone, resorcinol, pyrocatechol, phloroglucinol, salicylic acid and its esters, gentisic acid and its esters, gallic acid and its esters, bis-(4-hydroxyphenyl)-methane, 1,1-bis-(4-hydroxyphenyl)-ethane, 2,2-bis-(4-hydroxyphenyl)-propane, 1,1,3-tris-(4-hydroxyphenyl)-propane and their halogen derivatives.

Suitable carboxylic acid anhydrides are, for example, phthalic anhydride, pyromellitic anhydride, succinic anhydride, ethylhexanoic anhydride, octanoic anhydride, decanoic anhydride and lauric anhydride.

Suitable compounds containing at least one divalent sulphur atom are, for example, those quoted in French Pat. No. 2,104,970 filed by the Applicant Company on Sept. 11, 1970.

Suitable aromatic amines are, for example, the N,N-dialkylanilines, the naphthylamines, diphenylamine and triphenylamine.

The synergistic agents are preferably chosen from amongst benzodioxoles and polychlorinated ethers having a vapour pressure which is preferably at least equal to that of the insecticidal compound employed.

The benzodioxoles suitable as synergistic agents are, for example, safrole, isosafrole, 5-cyano-1,3-benzodioxole, 5-ethynyl-1,3-benzodioxole, 5-hydroxymethyl-1,3-benzodioxole, 5-cyanomethyl-1,3-benzodioxole, 5,6-dichloro-1,3-benzodioxole, 5-chloro-6-cyano-1,3-benzodioxole, 5-bromo-6-cyano-1,3-benzodioxole, 5-chloro-6-cyanomethyl-1,3-benzodioxole, 5-chloro-6-hydroxy-1,3-benzodioxole, 5-chloro-6-hydroxymethyl-1,3-benzodioxole, 5-chloro-6-hydroxyethyl-1,3-benzodioxole, 5-chloro-6-ethynyl-1,3-benzodioxole and 5-(3-oxo-but-1-enyl)-1,3-benzodioxole.

The suitable polychlorinated ethers are, for example, 1,1,1,2,6,7,7,7-octachloro-4-oxa-heptane and 1,1,2,6,7,7-hexachloro-4-oxa-1,6-heptadiene.

The amount of the composition, containing the active substance, retained by the plates of the reservoir depends principally on the nature of the plates and, to a lesser extent, on the nature and amount of diluent and/or supplementary material added to the pyrethrinoid active compound. In general terms, the weight of the active material is between 0.2 and 2 times that of the plates, and preferably between 0.5 and 1.5 times the weight of the plates.

The impregnation can be carried out by pouring the composition, in the liquid state, over the surface of the plates or steeping the plates in the liquid, the steeping being followed by draining if appropriate; this operation can be mechanised using, for example, a metering pump or a constantrate set of sprinklers, the amount of liquid deposited depending on the time of exposure of the plates under the set of sprinklers; it is also possible to use a controlled-pressure mangle so as to make it possible to retain the desired proportion of liquid; equally, it is possible to use a controlled-speed centrifuge drainer for the same objective. A method of impregnation which is of value in industrial operation consists, for example, of using long strips which are impregnated continuously and then cut to the desired size.

The impregnation can also be effected by placing the plates under vacuum or excess pressure in the presence of the active material.

The impregnation of the plates can also be effected automatically by a machine comprising an injection syringe and a conveyor belt which causes the plates to be impregnated to travel under this syringe.

To carry out the injection, the needle of the syringe is introduced into the edge of each plate or into the edge of the complete device.

It is also possible to use a solution of the active substance in a volatile solvent which is subsequently evaporated.

Figure 2:
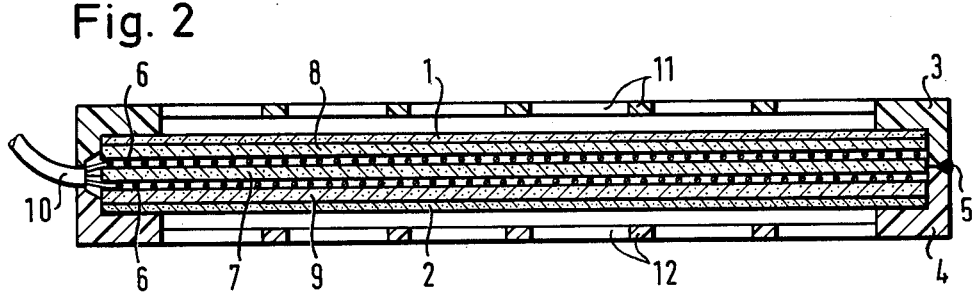

The device according to the present invention will now be described in more detail with reference to the attached drawing, in which:

FIG. 1 is an elevation view of a preferred embodiment of the device according to the invention and FIG. 2 is a cross-section along II—II of FIG. 1.

Referring to FIGS. 1 and 2 of the drawing, it is seen that the device illustrated comprises two plates 1 and 2 of fibrous material which constitute the reservoir of the device and can be impregnated with active material.

These plates are clamped in parallel and spaced apart from one another in a polyethylene case consisting of two halves 3 and 4. The two halves are joined by a circular weld 5.

A resistance 6, of a nickel/chromium alloy, in the form of a coil around a mica insulating plate 7, is lodged in the space between the two plates 1 and 2 of the reservoir, and mica insulating plates 8 and 9 are interposed between the resistance coil and the plates 1 and 2 of the reservoir, respectively.

An electrical wire 10 comprising two insulated conductors is connected to the resistance 6. The case 3,4 is provided with perforated faces 11 and 12, the perforations being in the form of windows.

Some devices according to the invention, and the results which have been obtained with these, are described below by way of examples.

EXPERIMENT I

Mica plates of 10 centimeters side length and 0.3 millimeter thickness, marketed under the name of "Samianite 41260" and manufactured by Usine de dielectriques de Delle (France) were used. 5.7 meters of a 80:20 nickel-chromium wire 50 microns thick and having a resistivity of 560 ohms per meter are wound around one of these plates, giving a total resistance of 3,150 ohms; the ends of this wire were each connected to a conducting wire ending in a male plug (see FIGS. 1 and 2).

The plate thus prepared was placed between two mica plates identical to the above but without a coil.

Secondly, two square plates of 11 centimeters side length were cut from a sheet of cellulose/asbestos board manufactured by the French company EMACO under reference HP5; the thickness of each plate was 3.2 millimeters and each weighed 10.3 g.

Each plate was dried and then impregnated with 23 grams of the following composition (representing 46 grams in total): 11% of bioallethrin (*) and 89% of didecyl phthalate.

(*) di-3,1-allyl-2-methyl-4-oxo-cyclopent-2-enyl d-transchrysanthemate.

Each part of the polyethylene frame possessed a perforated face in accordance with FIG. 2 of the drawing.

The impregnated plates were placed flat on either side of the resistance coil and the edges of the assembly were sealed hermetically by a polyethylene frame in two parts assembled by welding, a passsage for the conducting wire having been machined in the frame.

The device thus obtained was placed in a room wherein the temperature was kept at 22° ± 2° C and the relative atmospheric humidity was about 50.

The plugs of the conducting wire were connected to a 220 volts alternating current source, corresponding to the dissipation of a power of 15.3 watts. An internal temperature of 84° C was measured.

The device was weighed regularly so as to know the amounts of insecticidal compound evaporated and the following values (mg/day) were recorded.

Second day : 98 mg
Fifth day : 96 mg
Eighth day : 93 mg
15th day : 87 mg
22nd day : 82 mg
29th day : 78 mg
36th day : 73 mg
42th day : 69 mg On the 42nd day, the amount of bioallethrin still present in the device was measured by analysis and 1.8 grams were found, corresponding to an evaporation of 3.25 grams in accordance with that which was found from the loss of weight (74%).

EXPERIMENT II (Comparative)

A device in accordance with that described in French Pat. No. 2,054,435 (page 8, FIGS. 1 and 2) from Fumakilla Ltd (which device was purchased commercially) was used.

Plates of asbestos fibres, provided with the apparatus and found to contain, on analysis, 76.15(± 1.85) mg of allethrin were placed successively on the heating surface in order to assess the way in which this active material vapourised. With the apparatus connected to a potential of 232 volts, a temperature of 144° C was recorded between the pellet and the heating surface.

The amounts of allethrin vapourised were recorded hourly and were found to be as follows:

| first hour | : | 13.3 mg | (17.5%) |
| second hour | : | 10.0 mg | (13.1%) |
| third hour | : | 7.3 mg | (9.6%) |
| fourth hour | : | 5.3 mg | (6.9%) |
| fifth hour | : | 3.8 mg | (5.0%) |
| sixth hour | : | 2.8 mg | (3.7%) |
| seventh hour | : | 2.0 mg | (2.6%) |
| eighth hour | : | 1.5 mg | (2.0%) |
| Total | : | 46.0 mg | (60.4%) |

It is seen that over a period of as short as 8 hours the variation in the rate of evaporation is in a ratio of 1 to 9.

Over the same time, a decomposition of more than 30% of the allethrin vapourised was found.

In contrast, using the device according to the invention described in Experiment I, uniform vapourisation of bioallethrin (r), corresponding to excellent insecticidal efficiency against mosquitoes, was found, the results being as follows:

after 16 hours' operation : 4.1 mg/hour
after 112 hours' operation : 4.0 mg/hour
after 184 hours' operation : 3.9 mg/hour
after 520 hours' operation : 3.4 mg/hour after 858 hours' operation : 3.0 mg/hour The degree of decomposition of the bioallethrin vapourised was too low to be detected analytically. (r) Bioallethrin is the active compound in allethrin, which contains 50% thereof; accordingly, one milligram of bioallethrin corresponds, in insecticidal efficiency, to 2 milligrams of allethrin.

It can be seen that the devices according to the invention, by allowing uniform evaporation, without decomposition and over a very long period, are technically clearly superior to the existing devices.

EXPERIMENT III

A device as described in Experiment I was used, and insecticidal tests were periodically carried out therewith on mosquitoes (Culex pipiens) released into a room of 28 m³ which was hermetically sealed and kept at a temperature of 25° C. The device was introduced into the room at the same time as the mosquitoes and 1 hour afterwards the percentage of mosquitoes knocked down (KD) was noted. The values shown below were recorded:

on the second day : 100%
on the 16th day : 97%
on the 30th day : 91%

EXPERIMENT IV

A device like that described in Experiment I was used, but the insecticidal material therein consisted of the following: 11% of bioallethrin, 22% of 1,1,1,2,6,7,7,7-octachloro-4-oxa-heptane 67% of didecyl phthalate.

Insecticidal tests on mosquitoes (Culex pipiens) were carried out periodically, making it possible to record the following KD% after 1 hour:

on the second day : 100%
on the 16th day : 100%
on the 30th day : 82%
on the 40th day : 68%
on the 60th day : 65%

| COMPOSITION | Examples 1 to 12 ||||||||||||
| | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| INSECTICIDAL COMPOUND | | | | | | | | | | | | |
| ENT 21,559 | 50 | — | — | — | — | — | — | — | — | — | — | — |
| Cyclethrin | — | 15 | — | — | — | — | — | — | — | — | — | — |
| Dimethrin | — | — | 30 | 45 | — | — | — | — | — | — | — | — |

-continued

| | Examples 1 to 12 | | | | | | | | | | | |
|---|---|---|---|---|---|---|---|---|---|---|---|---|
| Biodimethrin | — | — | — | — | 20 | — | — | — | — | — | — | — |
| Allethrin | — | — | — | — | — | 25 | 40 | — | — | — | — | — |
| Furethrin | — | — | — | — | — | — | — | 10 | — | — | — | — |
| Benathrin | — | — | — | — | — | — | — | — | 35 | — | — | — |
| Prothrin | — | — | — | — | — | — | — | — | — | 20 | 30 | — |
| DMABC | — | — | — | — | — | — | — | — | — | — | — | 5 |
| ADJUVANT | | | | | | | | | | | | |
| Didodecyl phthalate | — | — | 30 | 26 | — | 23 | 31 | — | — | — | — | — |
| Dicetyl phthalate | — | — | — | — | — | — | — | — | — | 50 | 40 | 50 |
| Didecyl sebacate | 23 | — | — | — | — | — | — | 35 | 65 | — | — | — |
| 1-Bromo-octadecane | — | — | — | 20 | 20 | — | — | — | — | — | — | — |
| Chlorinated paraffin wax (w) | — | — | — | — | — | — | — | — | — | — | 20 | 44 |
| Liquid paraffin | 12 | 35 | 20 | — | — | — | — | — | — | — | — | — |
| Stearone | — | 18 | 19 | — | — | — | 20 | 15 | — | 25 | — | — |
| Magnesium distearate | 2 | — | — | — | — | — | — | — | — | — | 5 | — |
| isosafrole | — | 30 | — | — | — | — | — | — | — | — | — | — |
| 5-Bromo-6-cyano-1,3-benzodioxole | — | — | — | — | — | — | — | 40 | — | — | — | — |
| 5-(3-Oxo-but-1-enyl)-1,3-benzodioxole | — | — | — | — | 60 | — | — | — | — | — | — | — |
| 1,1,1,2,6,7,7-Octachloro-4-oxa-heptane | — | — | — | — | — | 50 | — | — | — | — | — | — |
| Pentachlorophenol | — | — | — | — | — | — | 2 | — | — | — | — | — |
| Paraphenylphenol | — | — | — | 3 | — | — | — | — | — | — | — | — |
| Dichlorophene (w') | — | — | — | — | — | — | — | — | — | 2 | — | — |
| Hexachlorophene (w'') | — | — | — | — | — | — | — | — | — | — | — | 1 |
| 1-(4-Phenylazo-phenylazo)-2-naphthol | — | — | 1 | — | — | — | 1 | — | — | — | — | — |
| 2,4,6-Tribromoaniline | — | 2 | — | — | — | — | — | — | — | — | — | — |
| Black dyestuff | — | — | — | — | — | 2 | — | — | — | 3 | — | — |
| Benzyl benzoate | 10 | — | — | — | — | — | — | — | — | — | — | — |
| Linalyl benzoate | 3 | — | — | — | — | — | — | — | — | — | — | — |
| Terpenyl cinnamate | — | — | — | 4 | — | — | 3 | — | — | — | — | — |
| Geranyl salicylate | — | — | — | 2 | — | — | — | — | — | — | — | — |
| Linalyl phenylacetate | — | — | — | — | — | — | 3 | — | — | — | — | — |
| Geranyl cinnamate | — | — | — | — | — | — | — | — | — | — | 5 | — |
| Preparation temperature (° C) | 85 | 80 | 85 | 40 | 40 | 20 | 95 | 75 | 20 | 70 | 80 | 85 |
| Weight used in grams | 50 | 45 | 115 | 40 | 80 | 20 | 55 | 12 | 35 | 30 | 25 | 35 |
| RESERVOIR | | | | | | | | | | | | |
| External surface area of one face (dm²) | 4 | 2 | 3 | 1.8 | 2 | 0.9 | 3 | 0.7 | 2 | 1.8 | 1.5 | 2 |
| Thickness of one plate (mm) | 1 | 5 | 6 | 2 | 6 | 5 | 1.5 | 1.5 | 3 | 3 | 3 | 3 |
| Total volume (cm³) | 80 | 200 | 360 | 72 | 240 | 90 | 90 | 21 | 120 | 108 | 90 | 120 |
| Nature of the plates | n | m | k | l | k | m | o | o | s | s | s | s |
| RESISTANCE | | | | | | | | | | | | |
| Magnitude, in 10³ ohm | 0.22 | 0.72 | 1.34 | 0.34 | 5.88 | 0.8 | 3.2 | 3.46 | 1.21 | 0.48 | 2.02 | 1.51 |
| Potential used, in volts | 110 | 120 | 220 | 110 | 230 | 120 | 240 | 220 | 220 | 110 | 220 | 220 |
| Power (watts/dm²) | 7 | 5 | 6 | 10 | 4.5 | 10 | 3 | 10 | 10 | 7 | 8 | 8 |
| Electrical insulant | p | p | r | q | r | q | r | q | q | r | r | r |

(w) a product marketed by Farbwerke HOECHST AG, having a melting range of 67 to 80° C and containing 69 to 72% of chlorine.
(w') common name of bis-(5-chloro-2-hydroxy-phenyl)-methane.
(w'') common name of bis-(3,5,6-trichloro-2-hydroxy-phenyl)-methane.
(k) Wood fibre plates weighing 24.2 g/dm²
(l) Waste paper board plates weighing 7.2 g/dm²
(m) Linen fibre board plates weighing 19.3 g/dm²
(n) Polyethylene and cotton fibre plates weighing 3.1 g/dm²
(o) Cellulose and asbestos fibre board plates weighing 4.5 g/dm²
(p) Polytetrafluoroethylene plate 1.5 millimeters thick
(q) Porcelain plate one millimeter thick
(r) Mica plate 0.3 millimeter thick
(s) Asbestos fibre plates weighing 16 g/dm².

We claim:

1. A device destined for the emission of vapours of an active substance, in particular an insecticidal substance, which comprises, in a rigid assembly,
   a. a reservoir containing the active substance and having an evaporation surface for the emission of the active vapours, said reservoir comprising
      i. a system of two plates of a porous fibrous material, one of the large faces of one of the plates facing one of the large faces of the other, and a frame for the plates, which separates the space between the two plates from the exterior whilst leaving entirely or partially free at least one of the two large external faces of the two plates, which can thus serve as an evaporation surface, and
      ii. an insecticidal pyrethrinoid substance having a vapour pressure, at 25° C, of between $1 \times 10^{-6}$ and $2 \times 10^{-4}$ mbar, said two plates being impregnated with said substance or substances, the total evaporation surface of the two plates being at least 10 cm², the amount of active substance in said reservoir being sufficient to give effective evaporation, at 90° C for a period of at least 10 hours, and the thickness of the plates being sufficient to absorb the said amount of active substance,
   b. an electrical resistance associated with the said reservoir in such a way as to heat at least the part of the said reservoir which comprises, or is close to, the said evaporation surface, said resistance being enclosed within the said system and being so constructed as to heat the large internal faces of the two plates to a temperature of up to 90° C, and
   c. a system for connecting the resistance to a source of electric current.

2. A device as described in claim 1, wherein the two plates are placed in parallel, and flat, on either side of the electrical resistance.

3. A device as described in claim 1, wherein the resistance consists of a resistance wire wound around a plate of a solid electrical insulating material.

4. A device as decribed in claim 1, wherein the electrical resistance is of a size substantially equal to that of the plates constituting the reservoir, and is separated from the plates constituting the reservoir by a means of electrical insulation.

5. A device as described in claim 4, wherein the electrical insulation is a coating chosen from amongst lacquers, paints and varnishes which are non-conductors of electricity and are inert towards the active material.

6. A device as described in claim 4, wherein the electrical insulation consists of two plates of solid electrical insulating material placed either side of the resistance, and is of a material selected from mica, asbestos and polytetrafluoroethylene.

7. A device as described in claim 1, wherein the plates which constitute the reservoir are made from at least one of the following materials: non-sized cellulose boards, boards containing asbestos, glass fibre boards, polymeric fibre boards, wool, a mixture of wool and cotton, felts, baked clay tiles, sintered alumina and porcelains which have not been subjected to biscuit baking.

8. A device as described in claim 1, wherein said frame is in the form of a case which surrounds the two plates constituting the reservoir and of which the faces superposed over the external faces of the two faces are perforated.

9. A device as described in claim 1, wherein the said frame is made of solid polyethylene, solid polypropylene or solid polyamide.

10. A device as described in claim 1, wherein the volume of the reservoir is between 4 and 400 $cm^3$.

11. A device as described in claim 10, wherein the surface of one of the sides of a plate is between 20 and 400 $cm^2$.

12. A device as described in claim 11, wherein the evaporation surface area of one of the large faces of a plate is between 40 and 200 $cm^2$, and the thickness of a plate is between 0.2 and 6 millimeters.

13. A device as described in claim 12, wherein the resistance is such as to absorb a power of between 0.5 and 10 watts per square decimeter of external surface of the plates constituting the reservoir.

14. A device as described in claim 10, wherein the plates of the reservoir are impregnated with 0.2 to 2 times their weight of a composition which contains at least 5%, calculated relative to the weight of the said composition, of an insecticidal substance having a vapour pressure in the defined range.

15. A device as described in claim 14, wherein the said composition contains an adjuvant which is inert towards the pyrethrinoid insecticidal compounds and is chosen from amongst diluents, thickeners, stabilisers, perfumes and dyestuffs.

16. A device as described in claim 14, wherein the said composition has a melting point not exceeding about 120° C.

17. A device as described in claim 14, wherein the weight of the said composition contained in the reservoir is between 0.5 and 1.5 times the weight of the plates of the said reservoir.

* * * * *